United States Patent [19]

Yamagishi et al.

[11] Patent Number: 5,222,008
[45] Date of Patent: Jun. 22, 1993

[54] AUDIO SIGNAL PROCESSING APPARATUS WHICH MAY DISPLAY REMAINING RECORDING OR REPRODUCING CAPACITY

[75] Inventors: Yoichi Yamagishi; Masaki Nakano, both of Yokohama, Japan

[73] Assignee: Canon Kabushiki Kaisha, Tokyo, Japan

[21] Appl. No.: 324,034

[22] Filed: Mar. 16, 1989

[30] Foreign Application Priority Data

Mar. 17, 1988 [JP] Japan ................................. 63-064130
May 10, 1988 [JP] Japan ................................. 63-111565
Jun. 10, 1988 [JP] Japan ................................. 63-141531

[51] Int. Cl.[5] ............................................. G11B 5/012
[52] U.S. Cl. .................................................... 360/137
[58] Field of Search ................ 360/8, 22, 132, 10.1, 360/137; 369/59, 53; 358/906, 909

[56] References Cited

U.S. PATENT DOCUMENTS

| 4,746,993 | 5/1988 | Tada .................... 369/53 X |
| 4,783,707 | 11/1988 | Nemoto et al. ............ 360/10.1 X |
| 4,825,324 | 4/1989 | Miyake et al. ............ 358/906 X |
| 4,912,570 | 3/1990 | Kinoshita et al. ........... 360/8 X |
| 4,914,526 | 4/1990 | Sakata et al. ............. 360/8 X |
| 4,947,280 | 8/1990 | Okada ................... 360/137 X |

FOREIGN PATENT DOCUMENTS 54-140507 10/1979 Japan ................................. 358/906

Primary Examiner—Robert S. Tupper
Attorney, Agent, or Firm—Fitzpatrick, Cella, Harper & Scinto

[57] ABSTRACT

In an information signal processing apparatus having a memory medium divided into a plurality of recording portions, a voice signal is recorded in the memory medium at a single recording portion or at a plurality of recording portions, with a time axis remaining uncompressed or being compressed at predetermined coefficient of compression. The remaining record capacity in a single record portion and/or the remaining record capacity in the memory medium can be displayed, depending on the coefficient of compression and whether the recorded voice is in a single recorded portion or in a plurality of recorded portions.

23 Claims, 16 Drawing Sheets

RECORDING IN SINGLE MODE

PAUSE IN SINGLE MODE

CONTINUE MODE

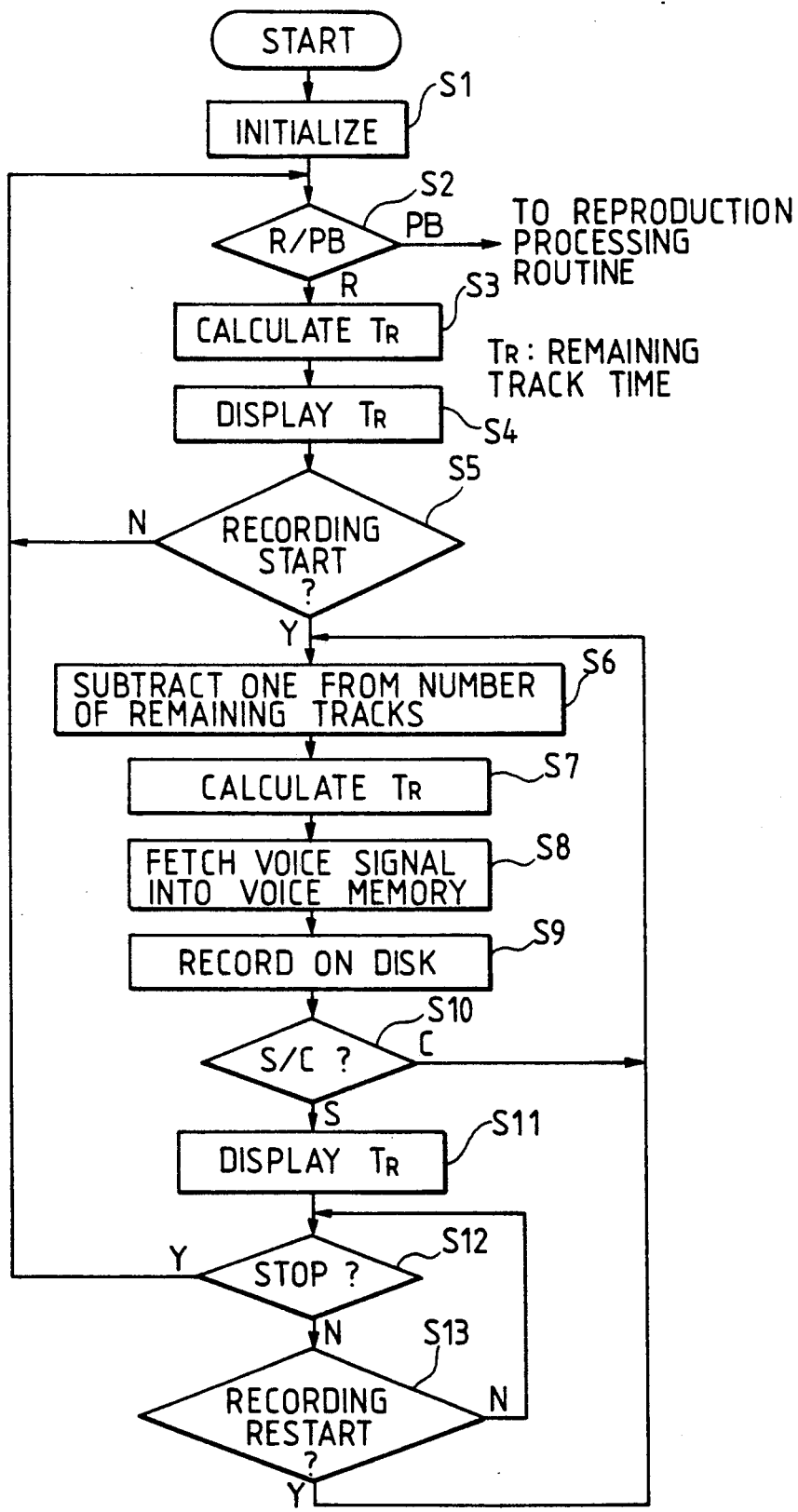

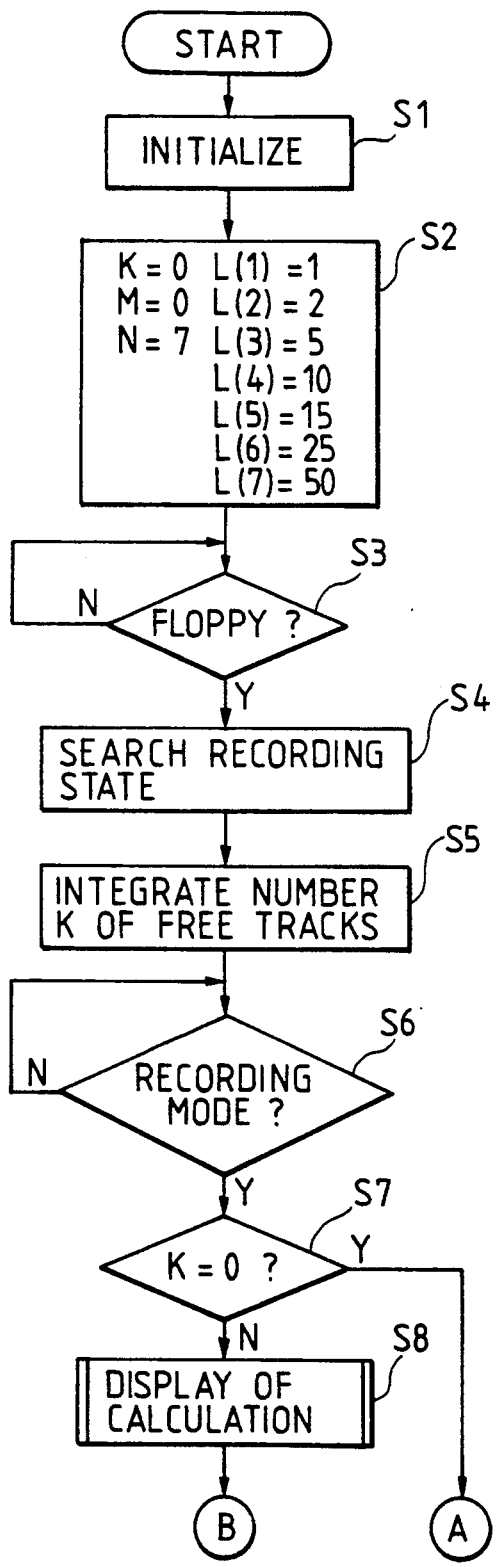

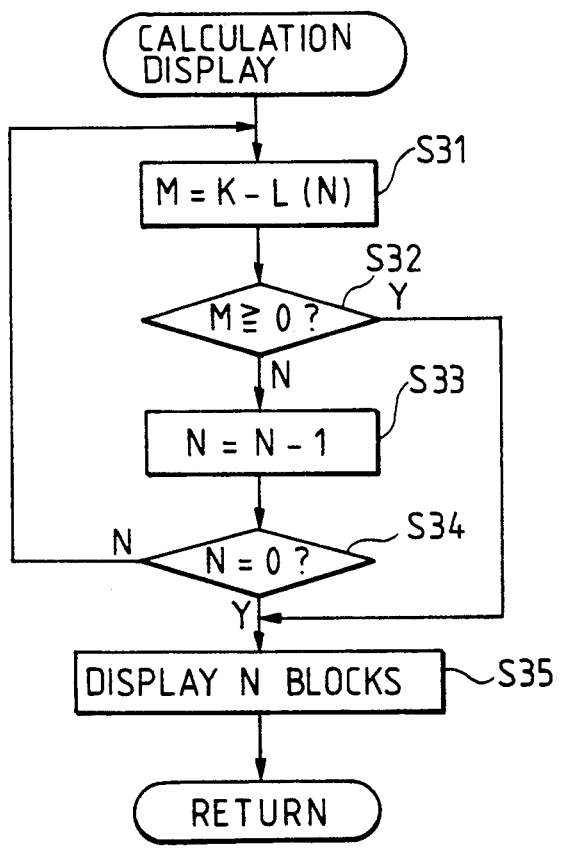

AUDIO SIGNAL PROCESSING APPARATUS WHICH MAY DISPLAY REMAINING RECORDING OR REPRODUCING CAPACITY

BACKGROUND OF THE INVENTION

1. Field of the Invention

The present invention relates to a voice signal processing apparatus.

2. Related Background Art

As a typical example of the voice signal processing apparatus of the described type, a voice signal recording system for a still video signal recording system is known.

In the voice signal recording system, using a magnetic disk (i.e., a still video floppy disk) adapted to record video signals for one field on each track, a voice signal is recorded as its time axis is compressed at a predetermined coefficient of compression. Specifically, there are two formats: one for recording voice signals on a single track; and the other for recording voice signals on a plurality of tracks. A known recording and reproducing system employing a still video floppy disk is furnished with a means for indicating the recorded condition on each track in the still video floppy disk.

However, with such indicating means, it is possible to note the number of images that can be additionally recorded, but it is impossible to grasp the remaining record capacity rapidly and accurately, until counting has been completed. In order words, when a voice is to be recorded on a single track or when a voice is to be recorded continuously on a plurality of tracks, the remaining record capacity could not be determined with precision.

In the conventional video reproducing apparatus having a voice reproducing function, as the video floppy disk is loaded, reproduction starts from a leading voice address according to the control code of a voice track, and thereafter, the track is moved along the succeeding voice addresses to reproduce the voices in order.

However, in the above discussed voice reproducing procedure, it is absolutely necessary to reproduce all of the voice tracks in a single video floppy disk in order to note the total time (i.e. the time required to reproduce the voices) of voice signals recorded in the video floppy disc. This is very timeconsuming.

Alternatively, it could estimate the voice reproducing time from the number of the voice tracks; however, if the voice record terminates short of the individual track, this unrecorded track portion causes an error of estimating. If there are many voice sequences in the tracks, individual errors must be accumulated so that only an inaccurate voice-reproducing time can be detected.

The foregoing problems, which encountered with the above-mentioned apparatus using a disk-like recording medium such as a still video floppy disk, would happen also on other apparatuses using any other medium.

SUMMARY OF THE INVENTION

It is therefore an object of the present invention to provide a voice signal processing apparatus which can eliminate the foregoing problems individually or collectively.

Another object of the invention is to provide a voice signal processing apparatus on which the remaining record capacity can be displayed, depending on the recorded condition.

According to a preferred embodiment of the present invention, these objects can be accomplished by a voice signal processing apparatus having a memory means divided into a plurality of record portions, in which apparatus a voice signal is recorded in the memory means at a single record portion or at a plurality of record portions, with a time axis of the voice signal remaining uncompressed or being compressed at a predetermined coefficient of compression, and in which the remaining record capacity in a single record portion and/or the remaining record capacity in the memory means can be displayed, depending on the coefficient of compression and whether the recorded voice is in a single record portion or in a plurality of record portions.

Still another object of the invention is to provide a voice signal processing apparatus with which it is possible to grasp the reproducing time with precision.

According to another preferred embodiment, this object can be accomplished by a voice signal processing apparatus in which information recorded on a recording medium can be reproduced by displaying data indicative an information signal with its time axis being compressed at a predetermined coefficient of compression, a start signal and an end signal, the apparatus comprising means for discriminating a record capacity between the start signal and the end signal, and means for calculating a reproducing time of the recorded information signal in accordance with the result of discrimination by the discriminating means.

A further object of the invention is to provide voice signal processing apparatus on which the remaining record capacity in terms of time can be displayed efficiently.

A still further object of the invention is to provide a novel voice signal processing apparatus which is designed to meet the still video standards.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a flow chart of FIG. 1;

FIGS. 13A and 13B are detail flow charts of FIG. 12, showing the manner in which the number of the remaining recordable tracks is displayed;

FIG. 14 is a flow chart of a calculation displaying routine indicated by S8 in FIG. 13A and by S16 in FIG. 13B;

DETAILED DESCRIPTION OF THE PREFERRED EMBODIMENT

Figure 1:
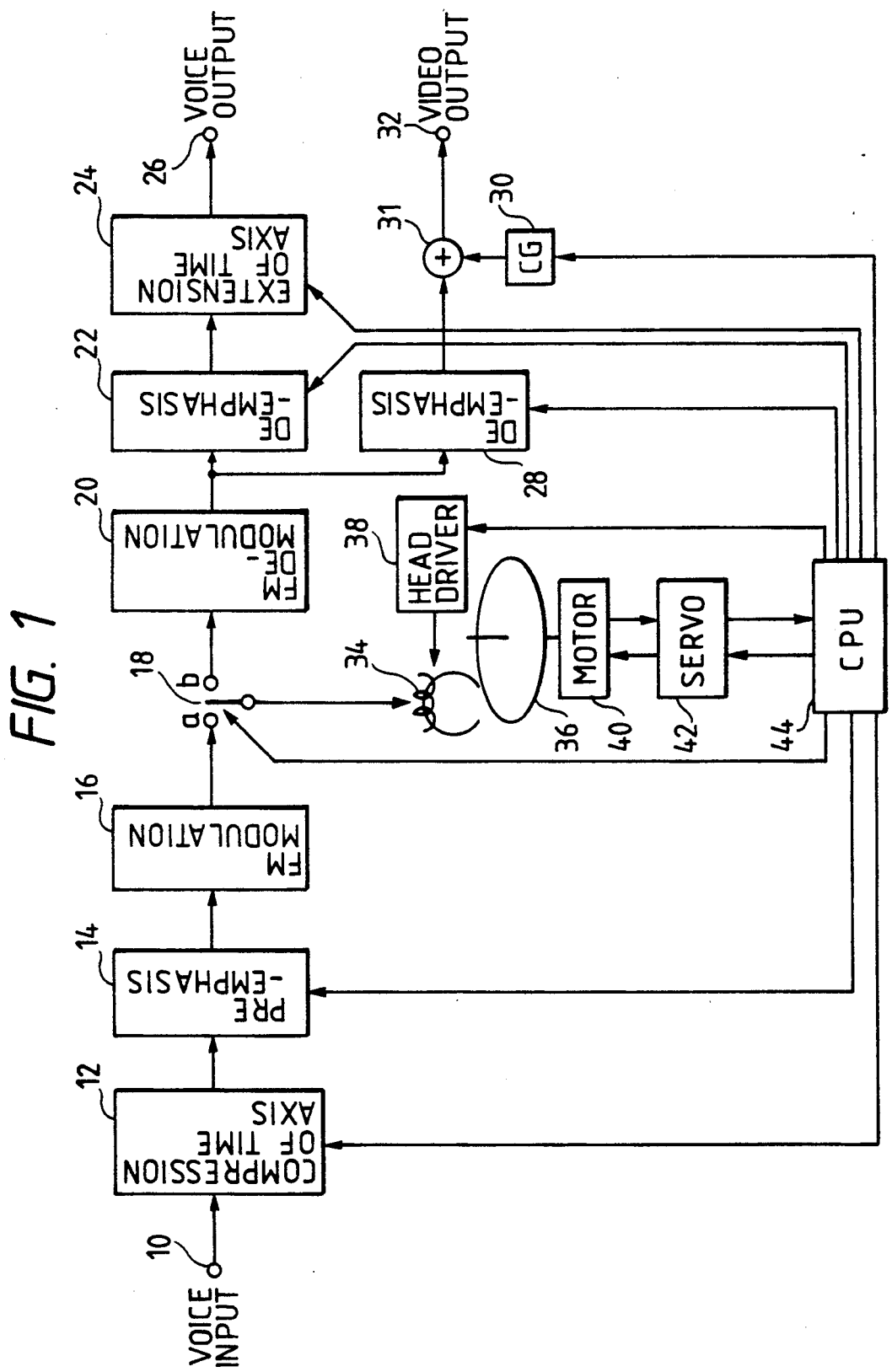
FIG. 1 is a block diagram of a first embodiment of the present invention.

The principles of the present invention are particularly useful when embodied in a voice signal processing apparatus (hereinafter called "apparatus"). FIG. 1 is a block diagram showing a first embodiment of the apparatus.

As shown in FIG. 1, the apparatus comprises an input terminal 10 for analog voice signals, a time-axis compression circuit 12, a pre-emphasis circuit 14, an FM modulation circuit 16, a recording/reproducing change-over switch 18, an FM demodulation circuit 20, a reproducing-voice-signal de-emphasis circuit 22 for recovering the emphasis process in the pre-emphasis circuit 14, a time-axis extension circuit 24, an output terminal 26 for reproducing voice signals, a reproducing video-signal de-emphasis circuit 28, a character generator 30 for display on the screen, and a mixing circuit 31 for overlapping the output of the character generator 30 over the output of the deemphasis circuit 28. The apparatus further comprises a video output terminal 32, a magnetic head 34 for recording and reproducing, a still video floppy disk or magnetic disk 36, a head driving circuit 38 for moving the magnetic head 34 rapidly of the magnetic disk 36, a motor 40 for rotating the magnetic disk 36, a servo circuit 42 for controlling the motor 40 so as to rotate at a predetermined rate, and a CPU (central processing unit) 44 for generally controlling the individual parts or devices of FIG. 1. Specifically, the CPU 44 controls the motor 40 via the servo circuit 42 and then controls the track position to be accessed by the magnetic head 34 by the head driving circuit 38, thus causing on-screen display information (described below) to be outputted from the character generator 30.

The mode of voice recording/reproducing operation of the circuitry of FIG. 1 will now be described in detail.

A voice signal inputted via the voice input terminal 10 is compressed with respect to its time axis by the time-axis compression circuit 12 and is then processed in a specified emphasis by the pre-emphasis circuit 14, whereupon the thus processed voice signal is supplied to the FM modulation circuit 16. The signal modulated by the FM modulation circuit 16 is recorded in the magnetic disk 36 as impressed by the magnetic head 34 via the switch 18. For voice reproducing, the reproducing signal of the magnetic head 34 is impressed by the FM demodulation circuit 20 via the switch 18. The voice signal demodulated by the FM demodulation circuit 20 is impressed by the time-axis extension circuit 24 via the de-emphasis circuit 22 to recover its original time axis. If the output of the magnetic head 34 is a video signal, the output of the FM demodulation circuit 20 is de-emphasized by the de-emphasis circuit 28 and is then supplied to the output terminal 32 via the mixing circuit 32.

Figure 2A:
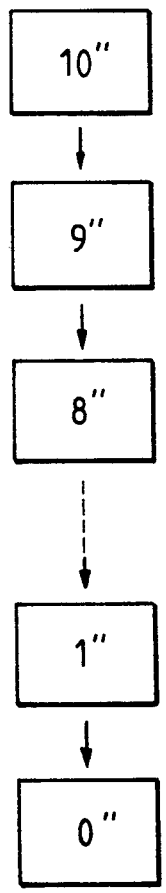
FIGS. 2A, 2B and 2C show examples of the display of the remaining record time.
Figure 2B:
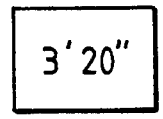
Figure 2C:
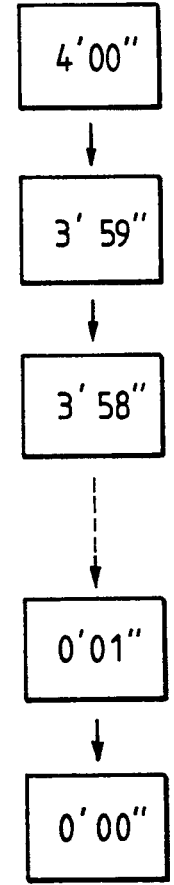

FIGS. 2A, 2B and 2C show examples of display of the remaining record capacity in terms of time. In the mode in which voice signals are to be recorded on only a single track in the magnetic disc 36 (hereinafter called "single mode"), the remaining record time of the track in use is displayed (FIG. 2A), and when the apparatus is in pause, the remaining record time of all of the tracks in the magnetic disk 36 is displayed when the apparatus is in pause (FIG. 2B). In the mode in which voice signals are to be recorded successively on a plurality of tracks (hereinafter called the "quantity mode"), the remaining record time of all of the tracks in the magnetic disk 36 is normally displayed (FIG. 2C). In either mode, the CPU 44 grasps the recorded and thus used condition of the magnetic disk 36, calculates the remaining record time in accordance with the coefficient of time-axis compression, and then causes the character generator 30 to operate so as to display the calculated time on the screen.

FIG. 3 is a detailed flow chart of the CPU 44. At its start, the CPU 44 first makes an initializaiton (S1), discriminates (S2) whether it is recording (R) or reproducing (PB), follows to the reproducing processing routine (not shown) when reproducing, and calculates (S3) the remaining time and thus track time $T_R$. This remaining track time $T_R$ can be obtained by multiplying the number of the remaining tracks by the coefficient of time-axis compression (i.e. 5, 10 or 20 according to the Standards). The result $T_R$ of this calculation is displayed (S5) at a predetermined position on the screen by the character generator 30; the foregoing procedures (S2, S3 and S4) are repeated (S5) until an instruction signal to start recording is issued. Upon issuance of this instruction signal, the CPU 44 subtracts 1 (one) from the number of remaining tracks (S6) and calculates again the remaining track time $T_R$ (S7). Subsequently, the CPU 44 obtains (S8) the voice signal from the input terminal 10 in a voice memory (included in the recording and reproducing).

Figure 5:
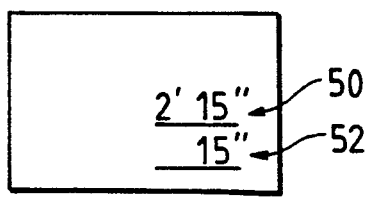
FIG. 5 is another example of the display of the remaining record time.

In the foregoing embodiment, the remaining time of a single track or the remaining time of all of the tracks can be displayed on the screen. Alternatively, as shown in FIG. 5, the remaining time of all tracks may be displayed at the upper row 50 on the screen, while the remaining time of the track in use may be displayed at the lower row 52.

In the illustrated embodiment, a still video floppy disk is used as a voice recording medium. However, the recording medium is not limited to a such floppy disk and may be in the form of a tape and a memory comprising a semiconductor. Further, the present invention can be applied not only to a voice recording system in which a voice signal is recorded with its time axis remaining or being compressed, but also to a memorytype recording system in which voice signals or voice data are recorded in groups of a constant quantity or amount.

As is apparent from the foregoing description, according to the preceding embodiment, since the remaining recordable time of the recording medium is displayed in accordance with the recording mode, it is possible to note in advance whether the remaining recordable time runs out or not while recording. Therefore, operability in voice recording can be markedly improved.

Figure 6:
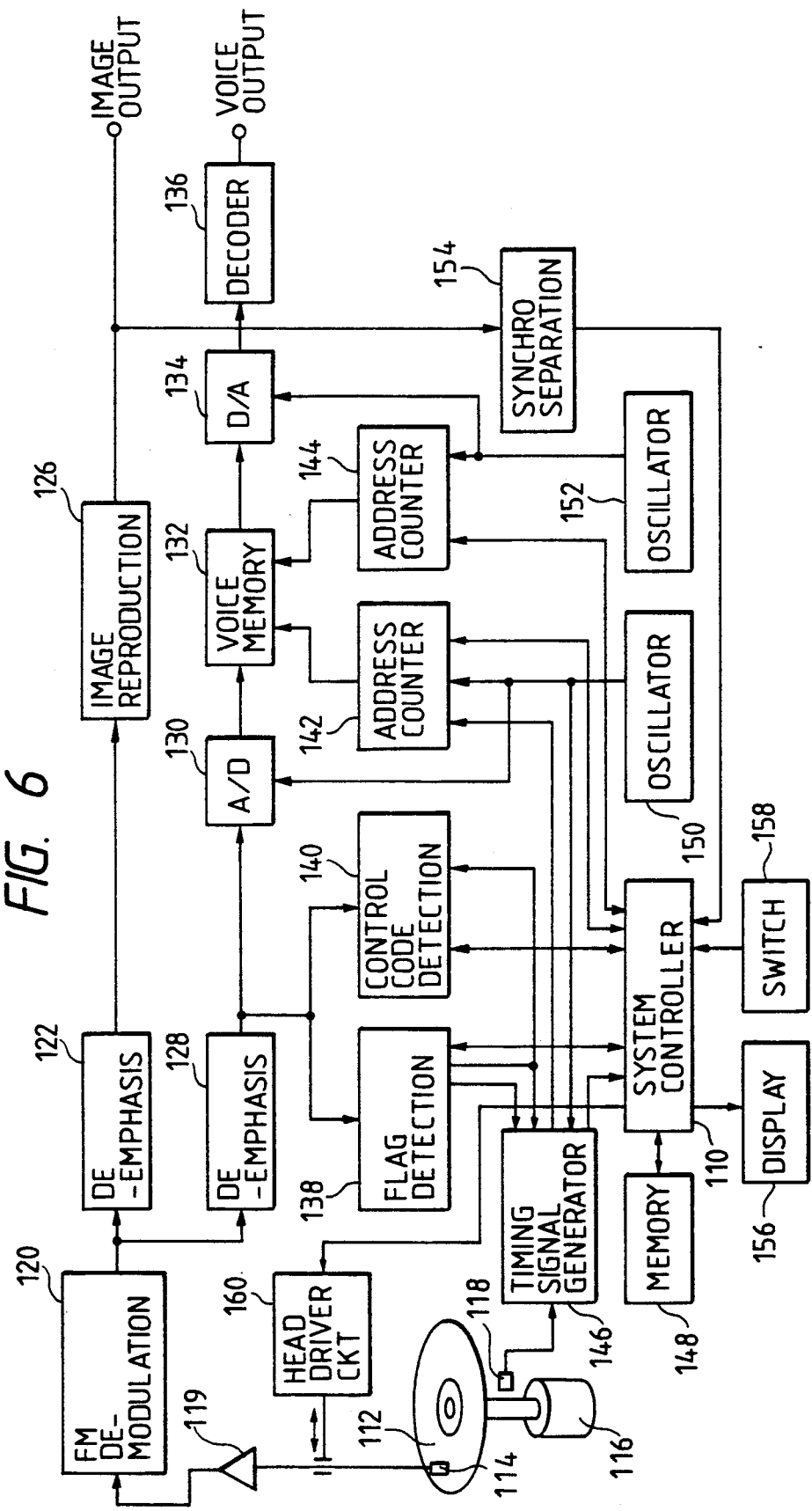
FIG. 6 is a block diagram of a second embodiment of the present invention.

FIG. 6 is a block diagram showing a voice reproducing system (hereinafter called system) according to a second embodiment of the present invention. The system reproduces from a recording medium in which start and end signals indicative of a recording portion, along with the information signal compressed in terms of time axis at a predetermined coefficient of compression, are recorded. In this system, the reproducing time of a recorded information signal can be calculated in accordance with the result of discrimination by means for discriminating the recordable capacity between the start signal and the end signal.

As shown in FIG. 6, the system comprises a system controller 110, a magnetic disk 112 as a recording medium, a reproducing head 114, a spindle motor 116 for rotating the magnetic disk 112, a sensor 118 for detecting a PG yoke of the magnetic disk 116, a preamplifier 119, an FM demodulation circuit 120, a de-emphasis circuit 122, and a video reproducing circuit 126 for outputting a standard television signal. The system further comprises a voice signal de-emphasis circuit 128, an A/D converter 130, a voice memory 132, a D/A converter 134, and a decoder 136 for decoding the analog output of the D/A converter 134 and for reducing noises. The system further comprises a flag detecting circuit 138 for detecting a start flag and a stop flag, a control code detecting circuit 140 for detecting a control code, an address counter 142 for outputting a writing address signal of the voice memory, another address counter 144 for outputting a reading-out address signal, a timing signal generating circuit 146 for outputting various timing signals in accordance with a rotary phase signal from the sensor 118, a memory 148 for retaining a variable for calculation, oscillators 150, 152, a separating circuit 154 for separating a synchronization signal from the output of the video reproducing circuit 126, a display unit 156 for visual indication, and a switch 158 for inputting various instruction signals, and a head driving circuit 160 for moving the head 14 radially of the magnetic disk 112.

The mode of operation of the system will now be described with reference to FIGS. 7, 8 and 9.

Upon completion of initialization, the system controller 110 stands by (S2) for loading of the magnetic disk 112, and after loading the magnetic disk 112, the controller 110 renders the spindle motor 116 to move (S3) the magnetic head 114 to a designated track position in the magnetic disk 112 by the head driving circuit 160. The output of the head 114 is impressed to the FM demodulation circuit 120 via the preamplifier 119 to be FM-demodulated. The video signal in the output of the FM demodulation circuit 120 is supplied to the video reproducing circuit 126 via the de-emphasis circuit 122. The video reproducing circuit 126 executes a known video reproducing process to output a video signal. In the meantime, the signals other than the video signal in the output of the FM demodulation circuit 120 are impressed to the A/D converter 130, a flag detecting circuit 138 and the control code detecting circuit 140 via the de-emphasis circuit 128.

At this stage, the voice reproducing time measuring routine (S4 and FIG. 8) starts; the system controller 110 sets (S31) the voice sector number to #0 and also sets the data pointer value of the address counter 142 to 0 (zero). The voice recording track is composed of four sectors #0, #1, #2, #3; recording is made on these sectors in this order from the PG yoke serving as a reference of a single rotation. The position of the PG yoke can be detected by the sensor 118, and the timing signal generating circuit 146 impresses the PG signal to the system controller 110 in accordance with the detection signal from the sensor 118. With the PG signal being as the reference signal, the system controller 110 receives the start flag signal and the end flag signal from the flag detecting circuit 38 and then outputs to the address counter 142 a control signal for an operation described below. The start flag signal outputted from the flag detecting circuit 138 is impressed also to the control code detecting circuit 140.

In accordance with the PG signal from the timing signal generating circuit 146, the system controller 110 designates a sector to be reproduced, with respect to the timing signal generating circuit 146. As it detects the start flag, the flag detecting circuit 138 outputs a start flag signal to the system controller 110. If no start flag signal is outputted from the flag detecting circuit 138 with respect to the designated sector, the system controller 110 terminates (S34) the voice reproducing time measuring routine (FIG. 8). If a start flag signal is outputted, the control code detecting circuit 140 searches (S35) a control code in accordance with the start flag signal outputted from the flag detecting circuit 138. When no control code can be detected, the measuring routine is terminated similarly.

On the other hand, in accordance with the start flag signal of the flag detecting circuit 138, the timing signal generating circuit 146 impresses a start signal, instructive to start counting, to the address counter 142. The A/D converter 130 digitalizes an input voice signal in accordance with a clock pulse from the oscillator 150. The output of the A/D converter 130 is written (S36) in the voice memory 132 under the address control of the address counter 142. To the address counter 150, a clock pulse similar to that with respect to the A/D converter 130 is impressed from the oscillator 150. Writing in the voice memory 132 is continued (S37) until the flag detecting circuit 38 detects an end flag to render the timing signal generating circuit 146 to instruct the address counter 142 to stop counting.

Upon completion of writing in the voice memory 132, the system controller 110 discriminates the recording type of the sector being reproduced, depending on the polarity of the start and end flags. Type 1 indicates the case in which the recording continues to the next sector of the same track; type 2 indicates the case in which the recording continues to the sector #0 of the succeeding track; type 3 indicates the termination of the voice sequence; and type 4 indicated that the track is unused. Therefore, one of the following routines will be taken (S38) depending on the type of the end flag. In the case of type 4, a discrimination is made (S41) as to whether this sector is a leading sector #0 of the track or not. If it is the sector #0, measuring is terminated. If it is not the sector #0, the coefficient of voice compression is noted, and the number of data per second during the voice reproducing is obtained and then is stored, together with the data pointer value of the address counter 142, in the memory 148, thus terminating (S42) the measuring routine of FIG. 9. Likewise, in the case of type 3, the number of data per second and the data pointer value are stored in the memory 48. If discriminated as the type 1 or 2, a discrimination is made as whether this sector is the sector #3 or not. If it is the sector #3, go to S42 to terminate measuring; if it is not the sector #3, shift up the sector number to return to S33 to continue measuring (S40).

Figure 7:
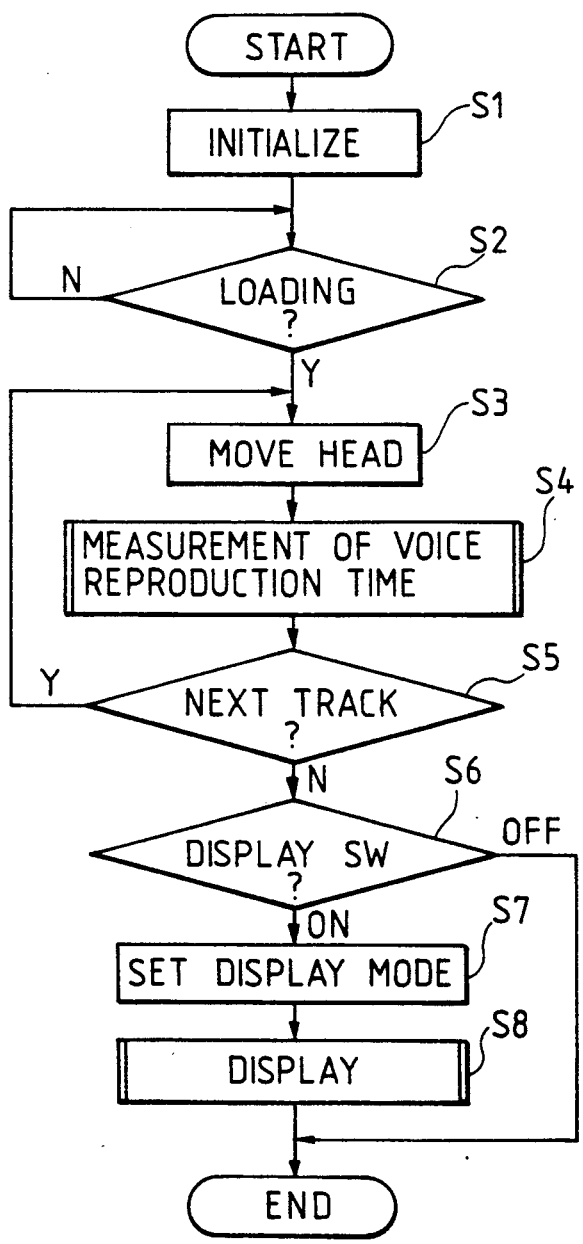
FIG. 7 is a basic flow chart of FIG. 6.

When the measuring of the voice reproducing time for a single voice track is terminated the process returns to the flow chart of FIG. 7, where the system controller 110 discriminates as to whether the measuring of the next track is to be made or not (S5). If the measuring is continued, the track is moved (S3); if the measuring is to be continued, an examination is made (S6) as to whether the display switch included in a group of switches 58 is turned on or off. If the display switch is off, the operation is terminated without displaying; if the display switch is on, setting of the display mode (S7) is made. The display mode is exemplified by a total time display for displaying the total reproducing time of voice signals recorded in a single video floppy disk, a sequence display for displaying the total time of the designated voice sequences, an entire sequence time display for displaying the total reproducing time of the individual voice sequences successively or simultaneously, a track time display for displaying the voice reproducing time of the designated track, and a video time display for displaying the total voice reproducing time if the voice spans several tracks.

After having set such display mode (S7), a display operation is executed (S8). FIG. 9 illustrates this display operation in detail. Upon completion of initialization (S50), the system controller 110 designates a read-out address of the memory 148 according to the setting of the display mode and then reads out the necessary data pointer value for each track and the number of data per second. The system controller 110 substitutes (S52) the data pointer value and the number of data per second in variables C and D, respectively. Practically, however, since the valuable C includes, in addition to the actual data, a pedestal, a control code and an overlap, the number of these data must be substituted in a variable E to make (S53) the following addition:

$$B = B + (C - E).$$

To add also the data of the next track according to the display mode, return to step (S51); to make no such addition, obtain (S55) the voice reproducing time by the equation: $A = B/D$ and then store (S56) the result A in the memory 148. The foregoing process is continued (S57) until necessary data can be obtained. The arithmetic results A of step S55 are successively stored in the memory 148, and are then successively transmitted (S58) to the display unit 156 to display (S59). The display unit 159 may use an LCD (liquid-crystal display) or an LED (light-emitting diode), for example. Thus a series of operations has been completed by this displaying.

Since in the memory 148, the data pointer value of each track and the number of data per second are stored, it is possible to redisplay in the same mode or to display in a different mode even after termination of operation. If the display unit 156 is furnished with a memory to store data to be displayed, such data can be redisplayed, irrespective of the store of the memory 148.

Figure 4:
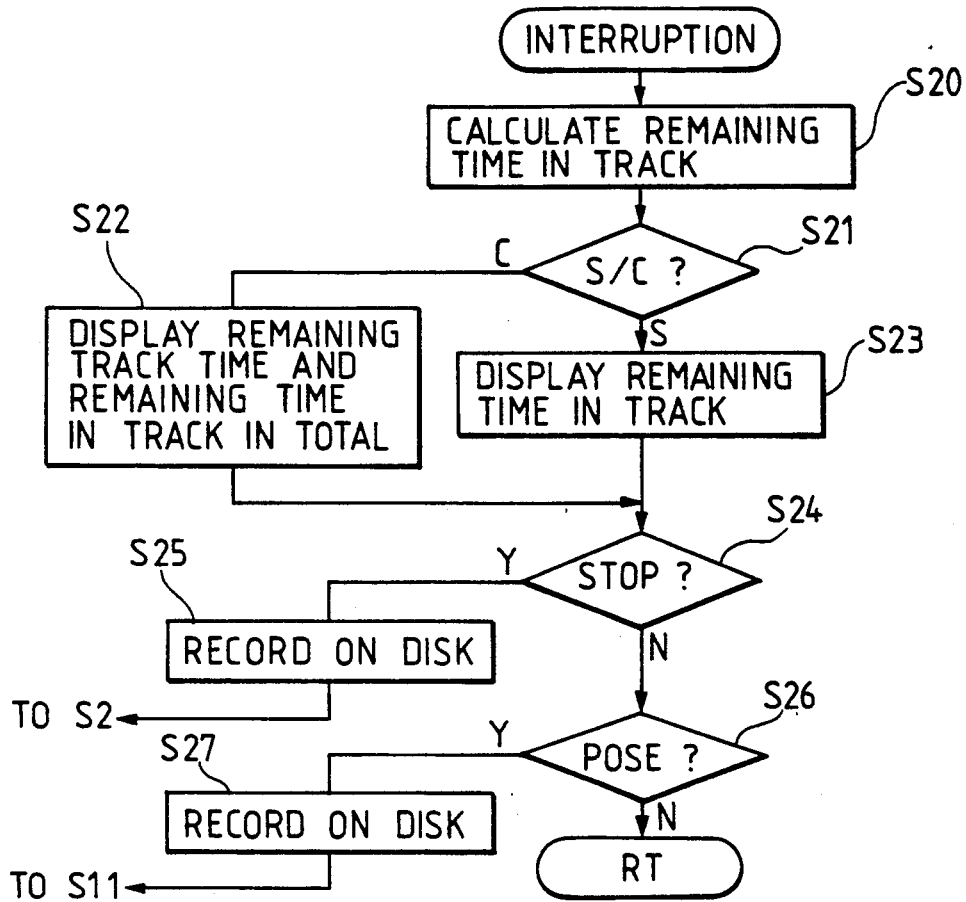
FIG. 4 is a detailed flow chart of an offering process of FIG. 3.
Figure 8:
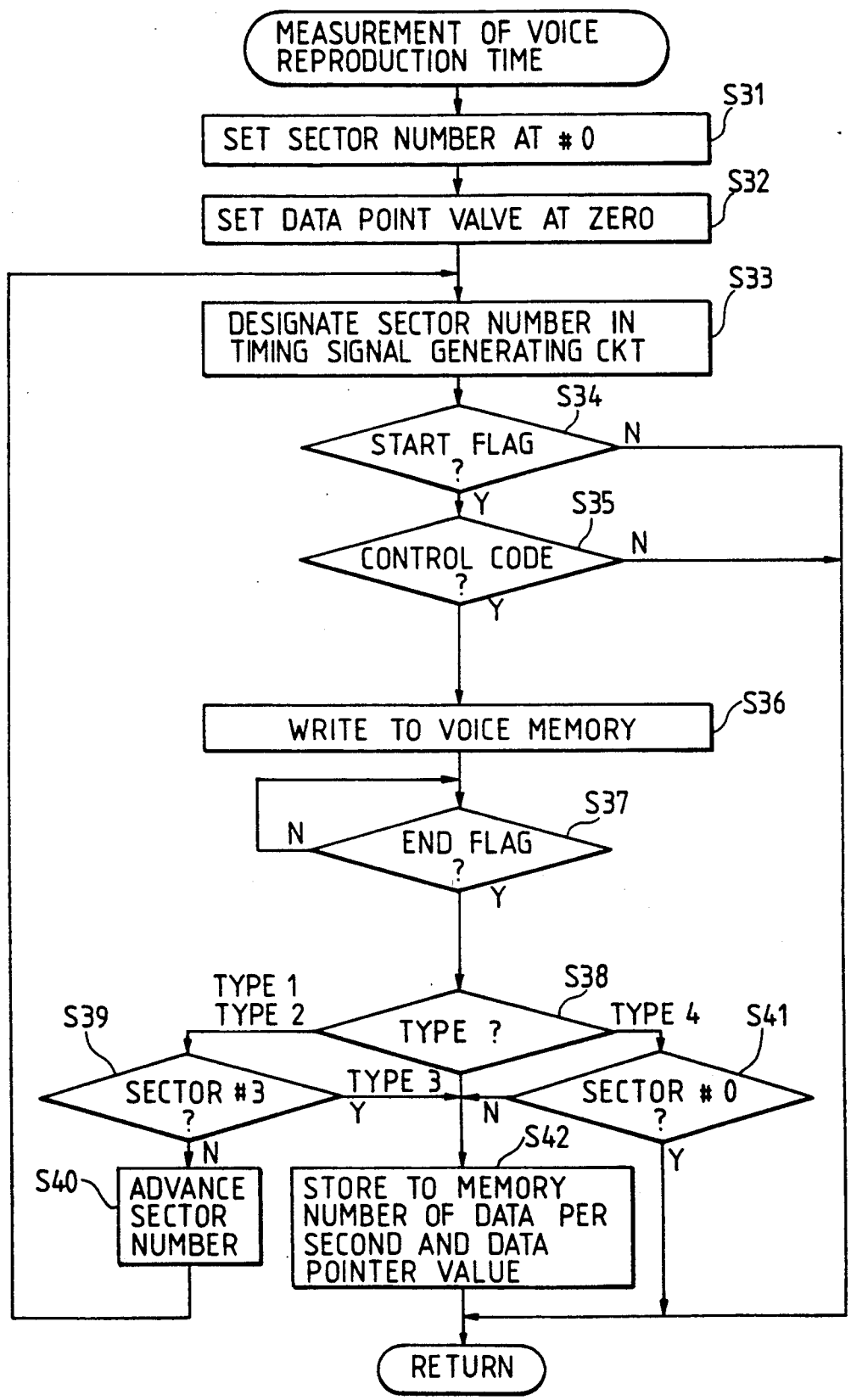
FIG. 8 is a detailed flow chart of a reproducing-time measuring routine in FIG. 7.
Figure 9:
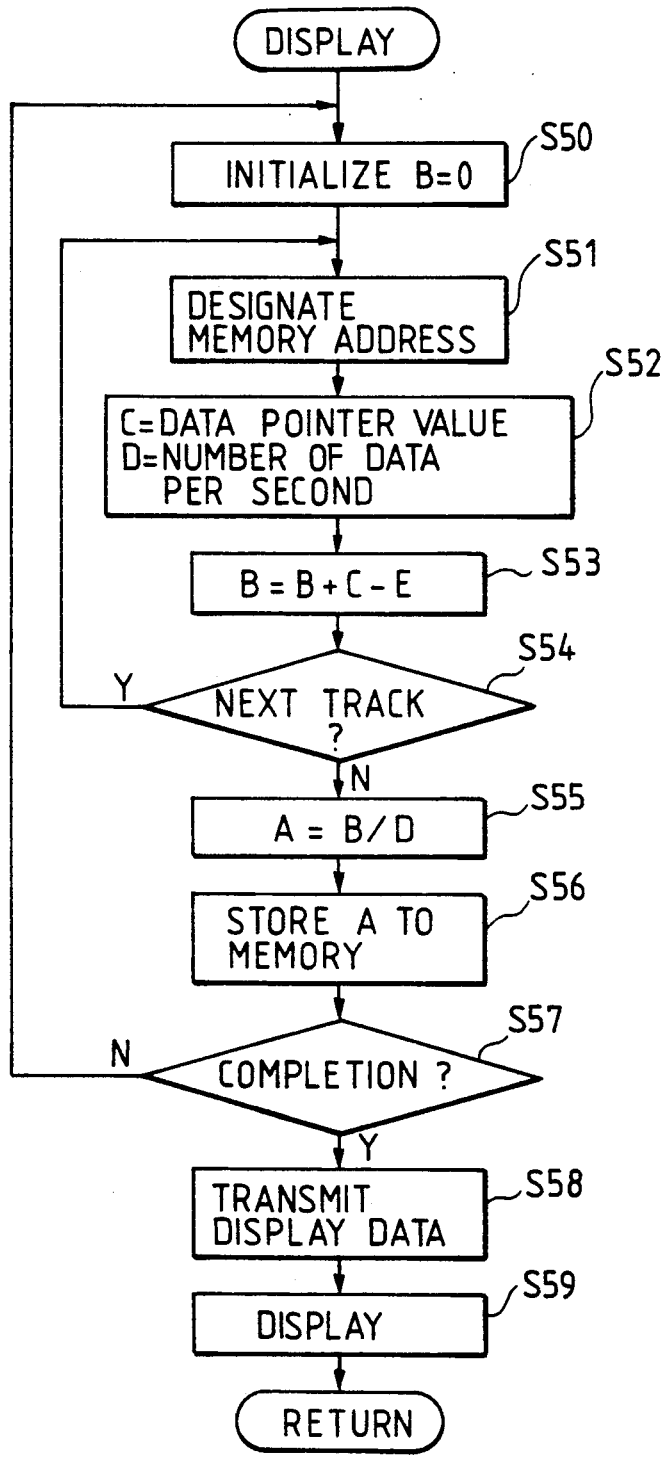
FIG. 9 is a detailed flow chart of a displaying routine in FIG. 7.
Figure 10:
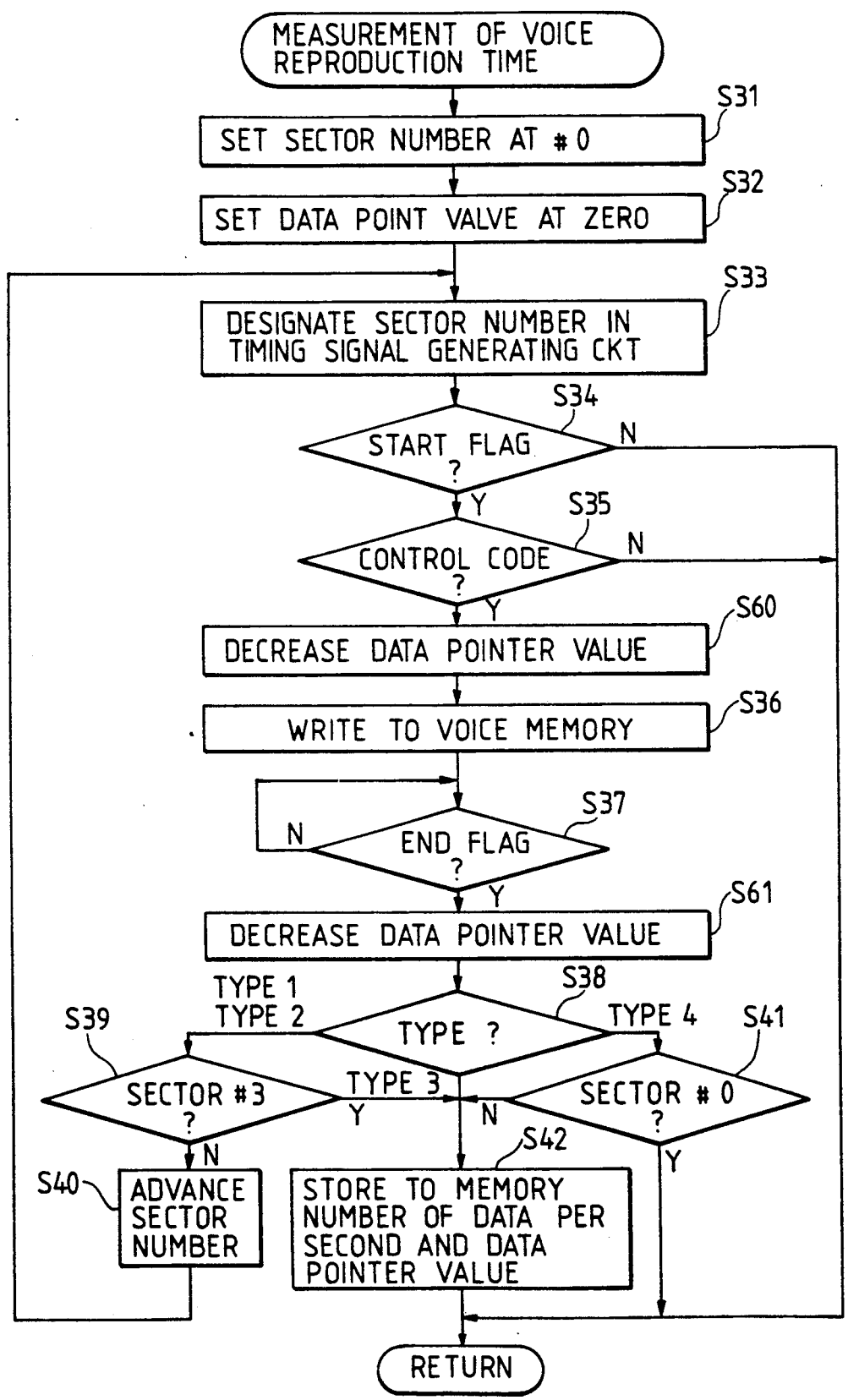
FIG. 10 shows an alternative embodiment of the reproducing-time measuring routine.
Figure 11:
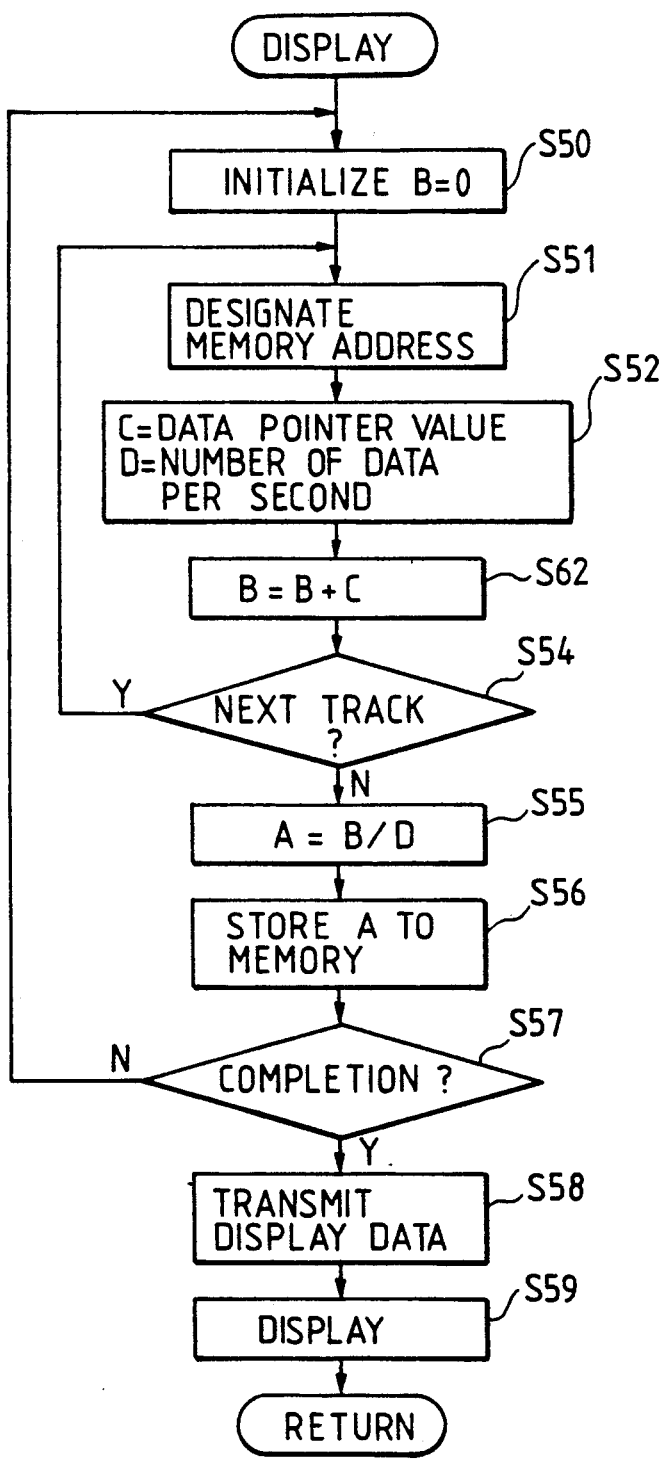
FIG. 11 shows an alternative embodiment of the displaying routine of FIG. 10.

FIGS. 10 and 11 are flow charts showing modified operations of FIGS. 8 and 9. FIG. 10 illustrates the voice reproducing measuring routine, while FIG. 11 illustrates the displaying routine. Like reference characters or numerals designate similar steps and parts corresponding to those of FIGS. 3 and 4. According to the video floppy disk standards, codes such as a pedestal, a control code and an overlap are disposed between the start flag and the voice data, while a predetermined length of pedestal is defined between the voice data and the end flag. In the flow chart of FIG. 8 the number of the sum of the voice data and these code data is stored in the memory 148; alternatively, in this embodiment, these codes are excluded beforehand from the number of data to be stored in the memory 148.

In the measuring routine of FIG. 10, like that of FIG. 8, the process advances to steps S31 - S35, and after step S35, prior to writing in the voice memory 132, the data pointer value is reduced (S60) by the number corresponding to the above codes between the start flag and the voice data. The timing signal generating circuit 146 supplies a signal, instructive to start counting, to the address counter 142 upon receipt of the start flag signal from the flag detecting circuit 138. The output of the A/D converter 130 is written (S36) in the voice memory 132 at an address corresponding to the data pointer value of the address counter 142. As the data pointer value is reduced at step S60, the voice data are written from 0 (zero) address. Likewise, the case of FIG. 8, writing in the voice memory 132 is continued (D37) until the end flag is detected. Upon completion of the writing, the system controller 110 subtracts (S61) the data pointer, which is retained in the address counter 142, by the number of data corresponding to the pedestal disposed between the voice data and the end flag. Thereafter, the operations progress in the same manner as in FIG. 8. As a result, the number of pure voice data is stored.

If the number of voice data is thus stored in the memory 148 as it is, the subtraction at step S53 of FIG. 9 is unnecessary; that is, only C may be added to B without subtracting E from C. Practically, step S53 of FIG. 9 may be changed to step S62 of FIG. 11.

In the illustrated embodiment, a still video floppy disk is used as a voice recording medium. However, the recording medium is not limited to such a floppy disk and may be in the form of a tape and a solid-state memory comprising a semiconductor. Further, data to be recorded are not limited to voice and may be any other information.

As is apparent from the foregoing description, according to this embodiment, it is possible to note, with maximum ease, an accurate reproducing time of the information signal recorded on the recording medium, and it is also possible to display such an accurate reproducing time in any of the various formats as desired.

Conventionally, in the recording and reproducing system of the type described above, it is known to examine as to whether all of the track of the still video floppy disk are recorded or unrecorded during the voice recording or the standing-by for voice recording, and it is also known to display the number of remaining recordable tracks or the recorded/unrecorded state in the form of a map. For example, it is known to display the number of recorded tracks or the number of remaining recordable tracks in an equal number of patterns or symbols (e.g. bars or blocks). Alternatively, the recorded tracks and the unrecorded tracks are displayed in different symbols or patterns, or are discriminated from each other with lighting on and lighting off.

However, in the case where the recording medium such as a still video floppy disk is provided with a multiplicity of tracks (e.g. fifty tracks), it necessitates a wide display region and would tend to be visually intricate.

Especially, considering that it is to record a naration inputted from a microphone or the like, because voice recording is made while reading a manuscript, the user can hardly observe the number of remaining tracks on the conventional display.

Figure 17:
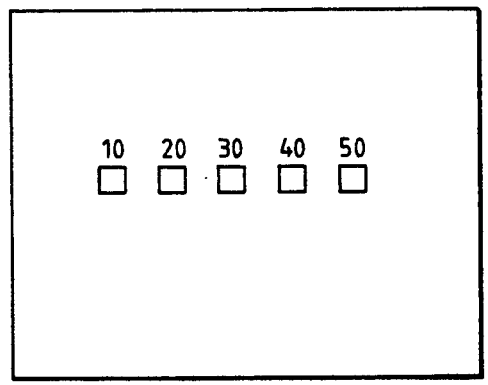
FIG. 17 shows a conventional example of display in blocks.

To solve the above problem, it could be considered to display the number of remaining tracks in patterns or symbols one for each of ten tracks, as shown in FIG. 17. However, this displaying method is inconvenient in that it is impossible to grasp the number of remaining tracks accurately if there remain less than ten tracks.

FIGS. 12 through 16 and 18 illustrate a third embodiment, with which it is possible to solve the above-discussed problem.

According to this embodiment, since the remaining record capacity of the recording medium is displayed in sections along a non-linear axis, the remaining record capacity is displayed finely when the remaining record capacity is small so that attention must be paid to make a new recording. And when the remaining record capacity is large so that attention is not absolutely necessary to make a new recording, the remaining record capacity is displayed roughly. Thus, it is possible to display the remaining record capacity of the recording medium in an appropriate manner depending on the largeness of the remaining record capacity.

Figure 12:
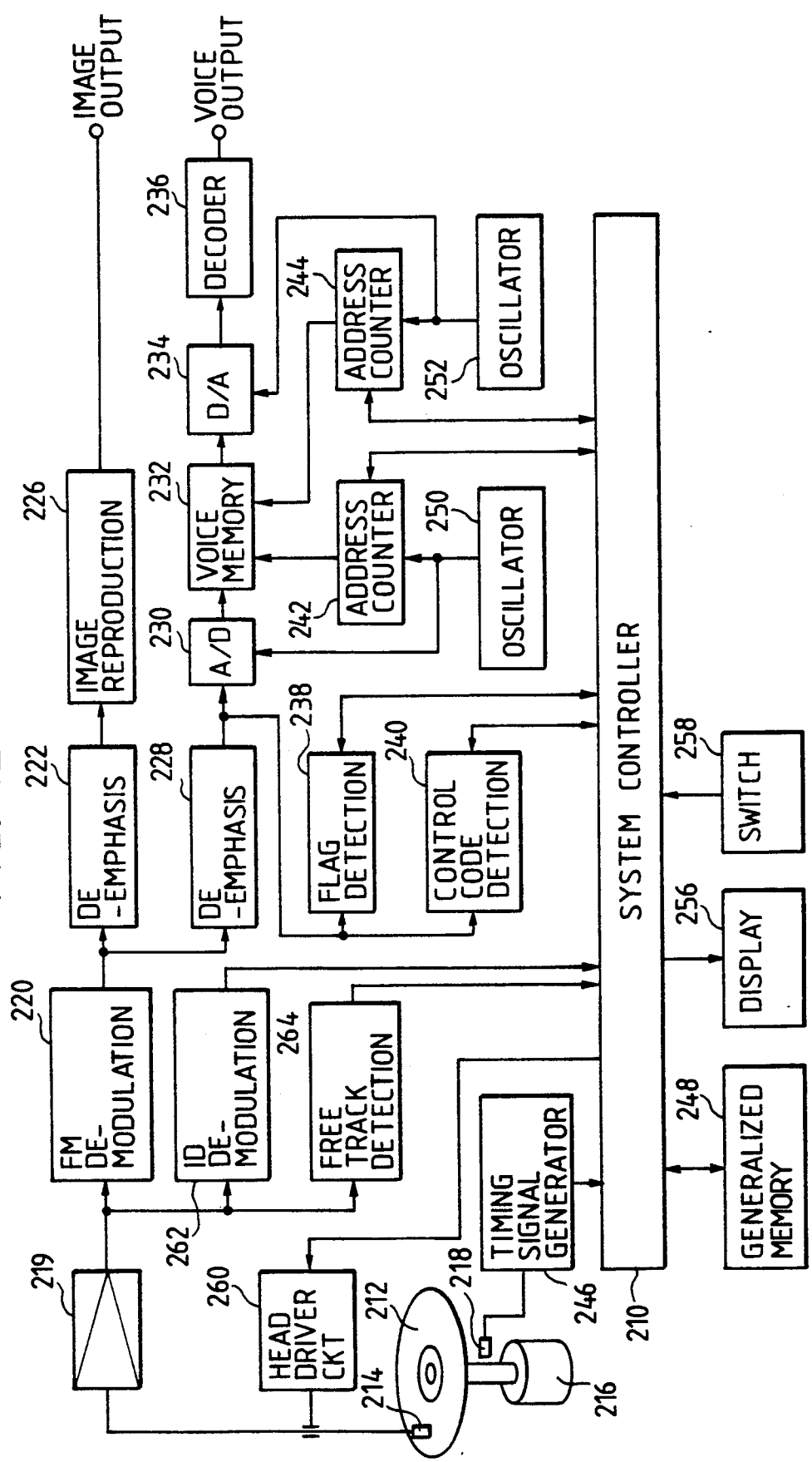
FIG. 12 is a block diagram of a third embodiment of the present invention.

FIG. 12 is a block diagram showing a reproducing system according to the third embodiment. In this system, information regarding the number of remaining tracks of the magnetic disk is displayed by employing an ordinary reproducing circuit, the magnetic disk being a still video floppy disk.

As shown in FIG. 12, the system comprises a system controller 210, a recording medium such as a magnetic disk 212, a reproducing head 214, a spindle motor 216 for rotating the magnetic disk 212, a sensor 218 for detecting a PG yoke of the magnetic disk 212, a preamplifier 219, an FM demodulation circuit 220, a de-emphasis circuit 222, and a video reproducing circuit 226 for outputting standard television signals. The system also comprises a voice-signal de-emphasis circuit 228, an A/D converter 230, a voice memory 232, a D/A converter 234, and a decoder 236 for decoding the analog output of the D/A converter 234 to reduce noises. The system further comprises a flag detecting circuit 238 for detecting a start flag and a stop flag, a control code detecting circuit 240, an address counter 242 for outputting a writing address signal of the voice memory 232, and another address counter 244 for outputting a reading-out signal of the voice memory 232.

The system still further comprises a timing signal generating circuit 246 for outputting various timing signals depending on a rotary phase signal from the sensor 218, a memory 248 for retaining recorded/unrecorded track information of the magnetic disk 212 and arithmetic variables, oscillators 250, 252, a display unit 256 for displaying a visual display, and a switch 258 for inputting various instructions. Additionally, the system comprises a head driving circuit 260 for moving the head 214 radially of the magnetic disk 212, an ID demodulation circuit 262 for demodulating an ID signal included in the reproducing output of the reproducing head 214, and a free-track detecting circuit 264.

The mode of operation of the system will now be described with reference to FIGS. 13A, 13B and 14.

Upon completion of initialization (S1), the system controller 210 initializes necessary variables K, M, N and L(1) through L(7) and stores them (S2) in the memory 248. Then, after having confirmed (S3) that the magnetic disk 212 has been loaded or is in loaded state, the system controller 210 causes the spindle motor 216 to rotate and locates, by the head driving circuit 260, the magnetic head 214 successively at from the first track to the last (50th) track in the magnetic disk 212 to thereby search (S4) each and every track for investigating the recorded state, namely, the used state of the magnetic disk 212.

Specifically, the output of the head 214 is impressed to the FM demodulation circuit 220, the ID demodulation circuit 262 and the free-track detecting circuit 264 via the preamplifier 219, whereupon the system controller 210 discriminates as to whether this track is recorded or unrecorded, from a free-track detection signal output of the free-track detecting circuit 264. If it is unrecorded (free track), the system controller 210 sets a free-track code and store the same, together with a track number, in the memory 248. If it is recorded or used, the system controller 210 discriminates as to whether the recording signal is a video signal or not, from the output of the ID demodulation circuit 262; if it is a video signal, the controller 210 also discriminates as to whether it is field recording or frame recording, from the output of the ID demodulating circuit 262, to set a field track code or a frame track code and stores the code, together with the track number, in the memory 248. If it is not a video signal, the controller 210 discriminates as to whether the information is voice or not. That is, the output of the FM demodulation circuit 220 is impressed to the flag detecting circuit 238 and the control code detecting circuit 240 via the de-emphasis circuit 228, whereupon the system controller 210 discriminates as to whether the track is a voice track (track on which a voice signal is recorded) or not, from the outputs of the flag detecting circuit 238 and of the control code detecting circuit 240. If it is a voice track, the controller 210 sets a voice track code and store the code, together with the track number, in the memory 248.

As the foregoing series of operations is made with respect to each and every track, the information about the recorded/unrecorded state of the individual track, voice/video, and in case of video, field/frame, is stored in the memory 248.

Thus, after the information of the record context of all tracks of the magnetic disk 212 has been stored in the memory 248, the system controller 210 searches the number of free tracks from the data of the memory 248 and substitutes (S5) the variable K with the searched number.

As the operator selects and instructs a recording operation by a mode setting switch included in a switch assembly 258, the system controller 210 searches the variable K of the number of free tracks. If K is 0 (zero), the controller 210 displays "not recordable" and terminates the operations (S19). If K is not 0, the controller 210 performs a calculation and displays a display for displaying the number K of the free tracks (S8). The calculation and the display are illustrated in detail by the flow chart of FIG. 14.

In FIG. 14, the system controller 210 reads out from the memory 248 the K value, the initialized value N (=7), and also L(N), namely, L(7). The system controller 210 calculates (S31) M=K−L(N), and examines (S32) as to whether M is 0 or more or not. As long as M is negative, the controller 210 decreases (S33, S34) N to recalculate M. As a result, N giving L(N) which is immediately near N and less than the number K of free tracks can be noted. From this N, the controller 210 displays N number of blocks (S35).

Specifically, if K is 0 (zero, no blocks are displayed; if K is 1, a single block is displayed; if $2 \leq K < 5$, two blocks; if $5 \leq K < 10$, three blocks; if $10 \leq K < 15$, four blocks; if $15 \leq K < 25$, five blocks; if $25 \leq K < 50$, six blocks; if K is 50, seven blocks.

Returning to FIG. 13A, after a display is displayed at S8, it stands by for the operation of a start switch of a switch assembly 258. When the start switch is depressed, the input voice signals from the voice input terminal are written (S10) successively in the voice memory for time-axis compression. During this writing, the controller 210 searches (S11, S12) as to whether the stop switch of the switch assembly 258 and a track change-over switch instructive to change-over to the next track are depressed or not. If it is depressed, the controller 210 executes a recording in the magnetic disk (S14). If it is not depressed, the controller 210 executes a recording S14) in the magnetic disk at the stage (S12) where the amount of information written in the voice memory reaches a predetermined value. This recording system and its signal processing per se are known in the art.

When at step S14 the signals are recorded on a single track, the system controller 210 subtracts (S15) 1 (one) from the number K of free tracks, and then executes the calculation display (S16) of FIG. 14 based on this new K. For example, assuming that K was 5 before the recording at S14, the number of display blocks, namely, N is 3. K will be 4 by S15, and as recalculated by the calculation display of FIG. 14, N will be 2 so that two blocks are displayed.

Thus, every time the recording in the magnetic disk is done, the system controller 210 executes the calculation display routine of FIG. 14 to renew the display number of free tracks. As a matter of course, when the record is erased, the number of free tracks increases so that the controller 210 similarly executes the calculation display routine of FIG. 14 to renew the displayed number of free tracks.

After the displayed number of free tracks has been renewed at S16, the system controller 210 discriminates (S17) as to whether the recording in the magnetic disk continues to the next track or not. If it does not continue, the controller 210 displays "terminate recording" and terminates the recording operation. If it continues to the next track, the controller 210 searches (S18) as to whether K is 0 (zero) or not. If K=0, there are no free tracks and therefore the controller 210 displays "not recordable" and terminates the recording operation. If K is 1 or more, the process returns to S10, and the controller 210 fetches data in the voice memory and continues the routines thereafter.

During the foregoing voice recording operation, it is possible to record voice afterwards by reproducing and displaying the corresponding image. In this case, the corresponding video tracks are reproduced immediately before writing in the memory.

By setting the non-linear value to any of L(1), L(2) ... L(7), it is possible to display the number of remaining recordable tracks in a non-linear unit.

Although N=7 in this embodiment, N corresponds to the maximum display number of blocks so that N may be set depending on the maximum number displayable in the display unit 256. Further, if the value of L(i) [i=1 to N] is set by a logarithmic function, it is possible to display the number of remaining recordable tracks efficiently. The case where N=6 is illustrated in FIG. 18, in which it may be L(1)=1, L(2)=2, L(3)=5, L(4)=10, L(5)=25, and L(6)=50.

Figure 13B:
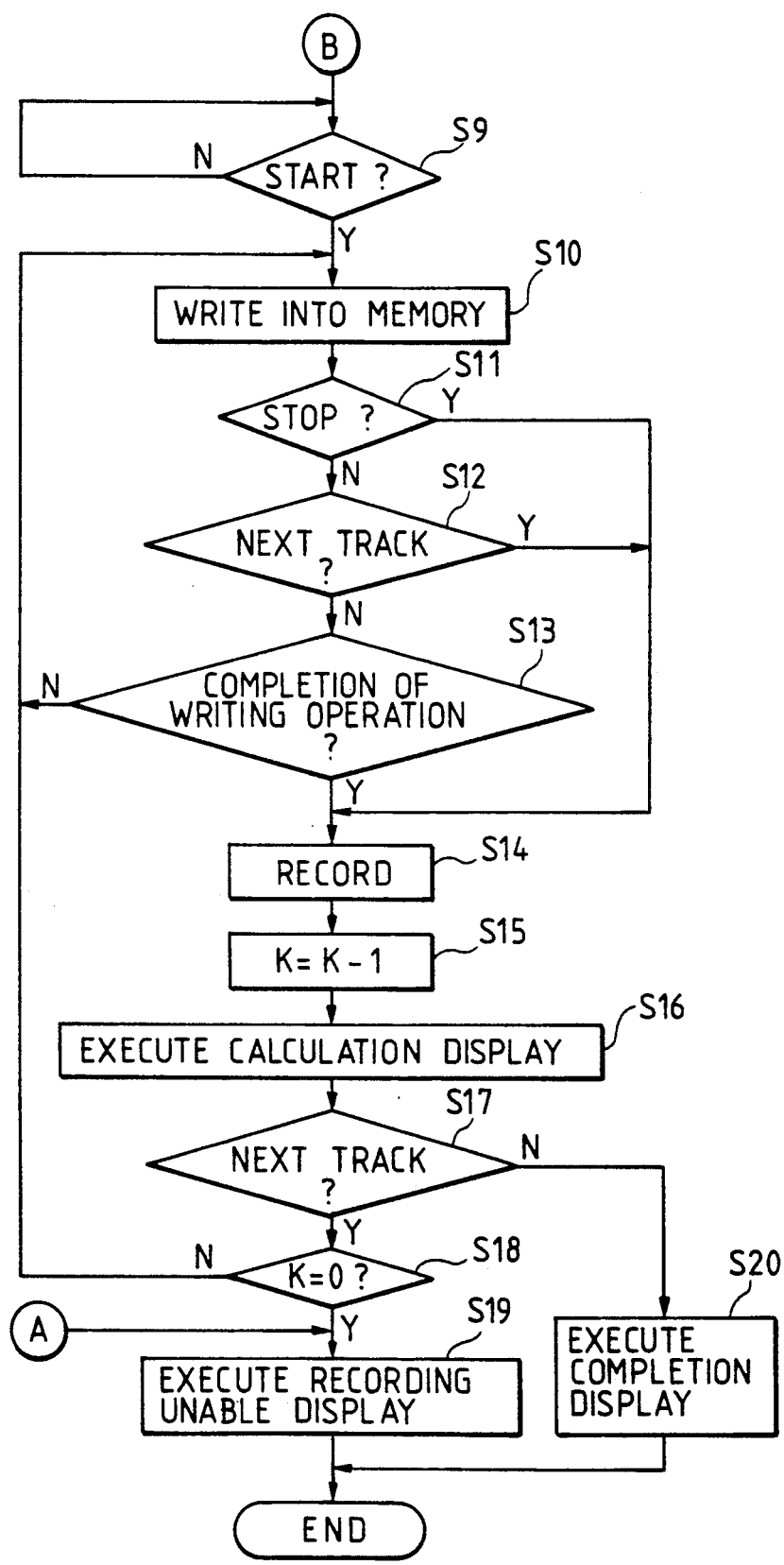
Figure 15:
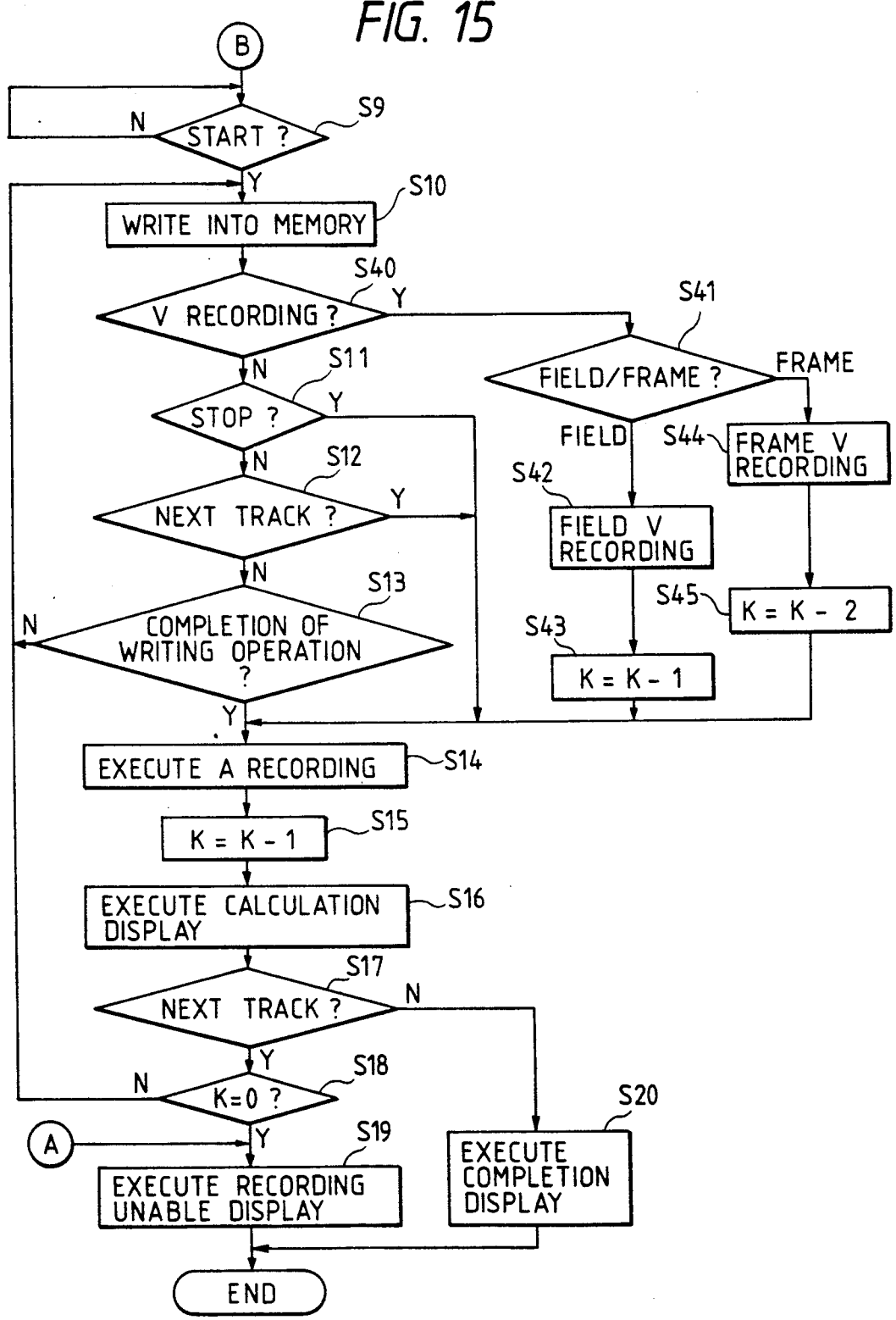
FIG. 15 shows a modification of FIG. 13B.

FIG. 15 illustrates a modification of the flow chart of FIG. 13B, in which modification the recording of video signals can be done simultaneously with the recording of voice signals. After having started (S10) writing in the voice memory, the system controller 210 discriminates (S40) as to whether the video recording is to be done or not. If it is not, the routine are the same as the case of FIG. 13B. If the video recording is to be done, the controller 210 searches (S41) as to whether it is set to field recording or frame recording. In the case of field recording, after moving the track, the controller 210 executes the field image recording (S42), subtracts 1 (one) from K, and moves the track to do the voice recording (S14). In the case of frame recording, after moving the track, executes the frame image recording (S44), subtracts (S45) 2 from K, and starts moving the track to execute the voice recording (S14). After S14, the routines are the same as the case of FIG. 13B.

Figure 16:
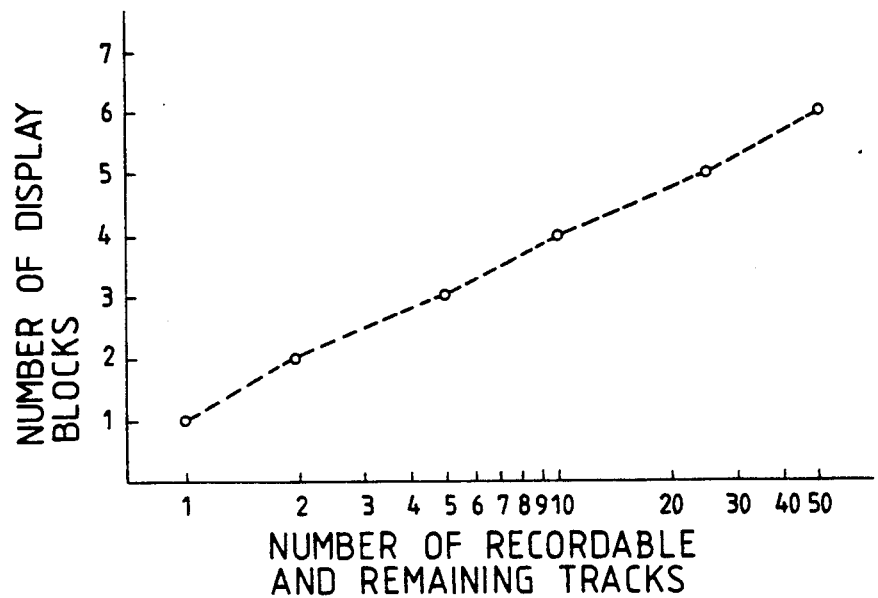
FIG. 16 is a graph showing an example of the manner in which the display is divided into blocks for nonlinear displaying.
Figure 18:
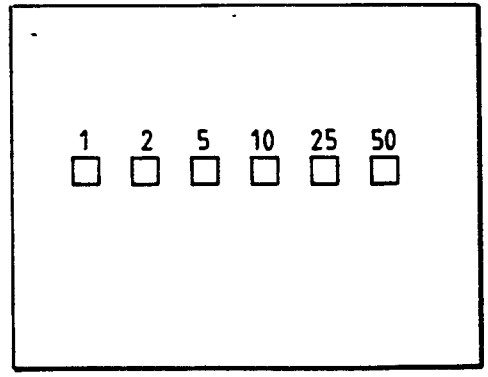
FIG. 18 shows an example of a display in blocks according to the present invention.

In this embodiment, the displays are non-linear as shown FIGS. 16 and 18. However, the present invention is not limited to such non-linear displays, and other various forms of displays may be employed.

As is readily apparent from the foregoing description, according to this embodiment, since the remaining amount of the recording medium is displayed as compressed in accordance with a non-linear axis, e.g. a logarithmic function, it is possible to provide more and effective information in a small display region.

Also in this embodiment, the recording medium is not limited to the floppy disk and may be in the form of a tape and a solid-state memory comprising a semiconductor.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An audio signal processing apparatus comprising:
   (a) recording means having memory means divided into a plurality of portions each being adapted for recording an audio signal;
   (b) control means for controlling said recording means, said control means having switching means for switching, in accordance with a manual selection, between a first recording mode in which the audio signal is recorded on a single portion of said memory means, and a second recording mode in which the audio signal is recorded continuously on a plurality of said portions until a record stop signal is received; and
   (c) display signal generating means for generating a display signal which corresponds to the unrecorded capacity of said memory means, wherein said display signal generating means generates a display signal which varies according to the recording mode set by said switching means.

2. An audio signal processing apparatus according to claim 1, wherein said memory means is a disk-like recording medium.

3. An audio signal processing apparatus according to claim 2, wherein said portions of said memory means are a plurality of concentric tracks in said disk-like recording medium.

4. An audio signal processing apparatus accord to claim 3, wherein said first recording mode is a mode for recording the audio signal on one of said concentric tracks, and said second recording mode is a mode for recording the audio signal continuously on a plurality of said concentric tracks.

5. An audio signal processing apparatus according to claim 1, wherein said display signal generating means includes a character generator.

6. An audio signal processing apparatus comprising:
 (a) recording means including a recording medium having a plurality of blocks each being adapted for recording an audio signal;
 (b) control means for controlling said recording means and for switching between a first recording mode in which the audio signal is to be recorded on a single block of said recording medium, and a second recording mode in which the audio signal is to be recorded continuously on a plurality of said blocks until a record stop signal is received;
 (c) display signal generating means for generating a display signal corresponding to a recording capacity of said recording medium, said display signal generating means changing the display signal according to the recording mode set by said control means.

7. An audio signal processing apparatus according to claim 6, wherein said display signal generating condition of the display depending on the switching between said first and second recording modes by said control means.

8. An audio signal processing apparatus according to claim 6, wherein said recording medium is a disk-like recording medium.

9. An audio signal apparatus according to claim 8, wherein said blocks of said recording medium is a plurality of concentric tracks in said disk-like recording medium.

10. An audio signal processing apparatus according to claim 6, wherein said first recording mode is a mode for recording the audio signal on one of said concentric tracks, and said second recording mode is a mode for recording the audio signal continuously on a plurality of said concentric tracks.

11. An audio signal processing apparatus according to claim 6, wherein said recording means includes a head movable on said recording medium.

12. An audio signal processing apparatus according to claim 6, wherein said display signal generating means includes a character generator.

13. An information processing apparatus, comprising:
 (a) memory means in which an information signal compressed at a predetermined coefficient of compression is recorded together with a plurality of recorded section signals each of said section signals being indicative of a section in said memory means where the information signal is recorded, each said recorded section signal including a start signal indicative of a start of the recording of said information signal and an end signal indicative of an end of the recording of said information signal;
 (b) reproducing means for reproducing the information signal from said memory means;
 (c) means for obtaining, from the recorded section signals and the co-efficient of compression, a signal representing a reproducing time of the information signal; and
 (d) means for displaying a reproducing time of the information signal in accordance with the signal obtained by said obtaining means.

14. An information processing apparatus according to claim 13, wherein the information signal is recorded, in said memory means, along with a signal indicative of the coefficient of compression.

15. An information processing apparatus according to claim 13, wherein the information signal is an audio signal.

16. An information processing apparatus according to claim 13, wherein said memory means is a disk-like recording medium.

17. An information processing apparatus according to claim 16, wherein said reproducing means includes a reproducing head for reproducing the information signal from said disk-like recording medium.

18. An information processing apparatus according to claim 15, wherein the audio signal is compressed with respect to its time axis in accordance with the coefficient of compression.

19. An information processing apparatus according to claim 13, further comprising display means for displaying the reproducing time obtained by said obtaining means.

20. An information processing apparatus according to claim 13, wherein the information signal is recorded as an FM-modulated signal.

21. Apparatus for displaying the remaining recording capacity of a recording medium having a recordable region divided into a plurality of portions each adapted to record a predetermined amount of information, said apparatus comprising:
 (a) means for determining and retaining the remaining recording capacity of said recording medium in the portions;
 (b) converting means for converting said remaining recording capacity by using a non-linear function; and
 (c) display means for displaying the remaining recording capacity in accordance with the output of said converting means.

22. An information signal processing apparatus according to claim 21, wherein said retaining means includes:
 means for discriminating whether each portion is recorded for unrecorded; and
 memory means for storing the result of the discrimination by said discriminating means.

23. An information signal processing apparatus according to claim 21, wherein said display means includes:
 means for converting the remaining recording capacity of the recording medium into a predetermined pattern signal; and
 means for supplying to said display means the pattern signal converted by said converting means.

* * * * *

UNITED STATES PATENT AND TRADEMARK OFFICE
CERTIFICATE OF CORRECTION

PATENT NO. : 5,222,008
DATED : June 22, 1993
INVENTOR(S) : YOICHI YAMAGISHI, ET AL.

It is certified that error appears in the above-indentified patent and that said Letters Patent is hereby corrected as shown below:

COLUMN 1
    Line 24, "a" should read --the--.
    Line 25, "the" should read --a--.
    Line 47, "time consuming" should read --time-consuming--.

COLUMN 2
    Line 25, tive" should read --tive of--.
    Line 33, "provide" should read --provide a--.

COLUMN 3
    Line 1, "detail" should read --detailed--.

COLUMN 4
    Line 54, "a such" should read --such a--.
    Line 59, "memorytype" should read --memory-type--.

COLUMN 6
    Line 52, "indicated" should read --indicates--.

UNITED STATES PATENT AND TRADEMARK OFFICE
CERTIFICATE OF CORRECTION

PATENT NO. : 5,222,008
DATED : June 22, 1993
INVENTOR(S) : Yoichi Yamagishi, et al It is certified that error appears in the above-indentified patent and that said Letters Patent is hereby corrected as shown below:

Column 9, line 1, "naration" should read --narration--

Signed and Sealed this

Twenty-second Day of March, 1994

Attest:

BRUCE LEHMAN

Attesting Officer     Commissioner of Patents and Trademarks